Dec. 11, 1923.
H. G. WAGNER
1,476,782
APPARATUS FOR MAKING ELECTRIC BATTERY ELEMENTS
Filed Feb. 20, 1922  3 Sheets-Sheet 1
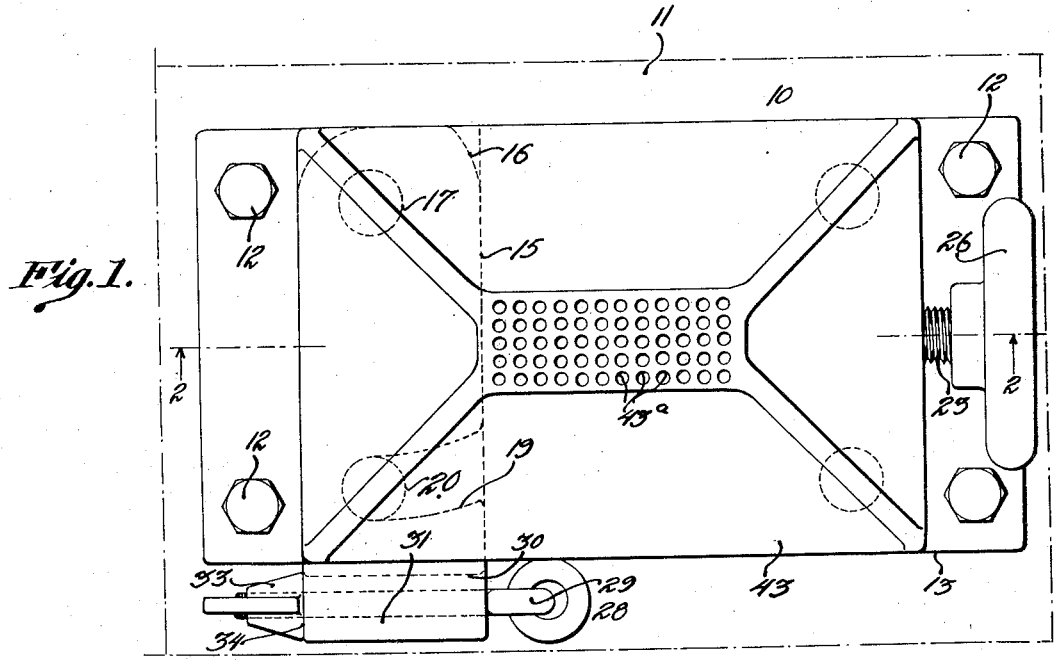
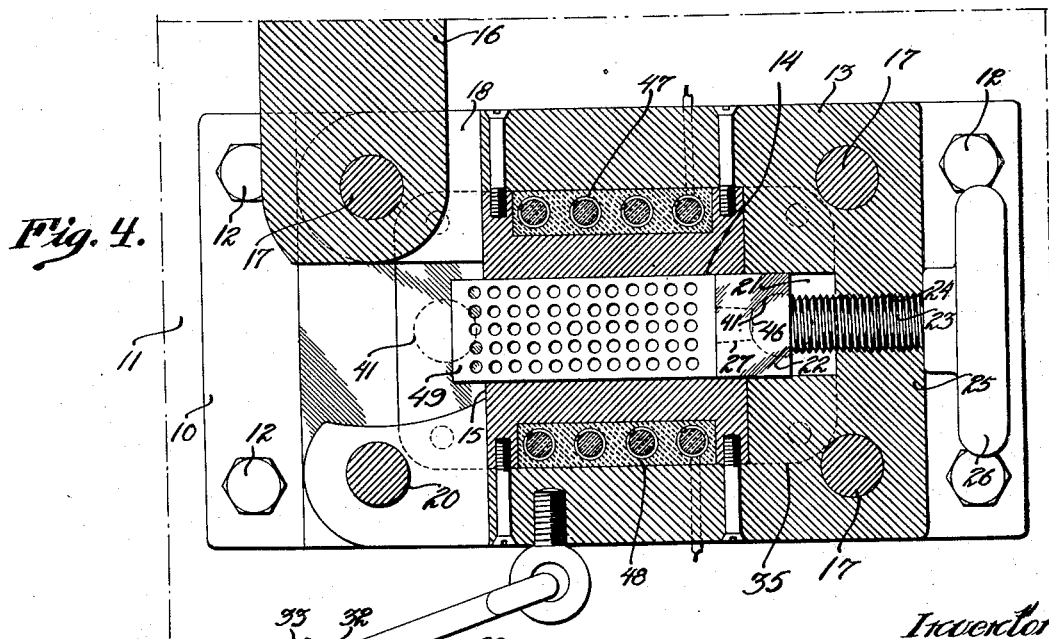

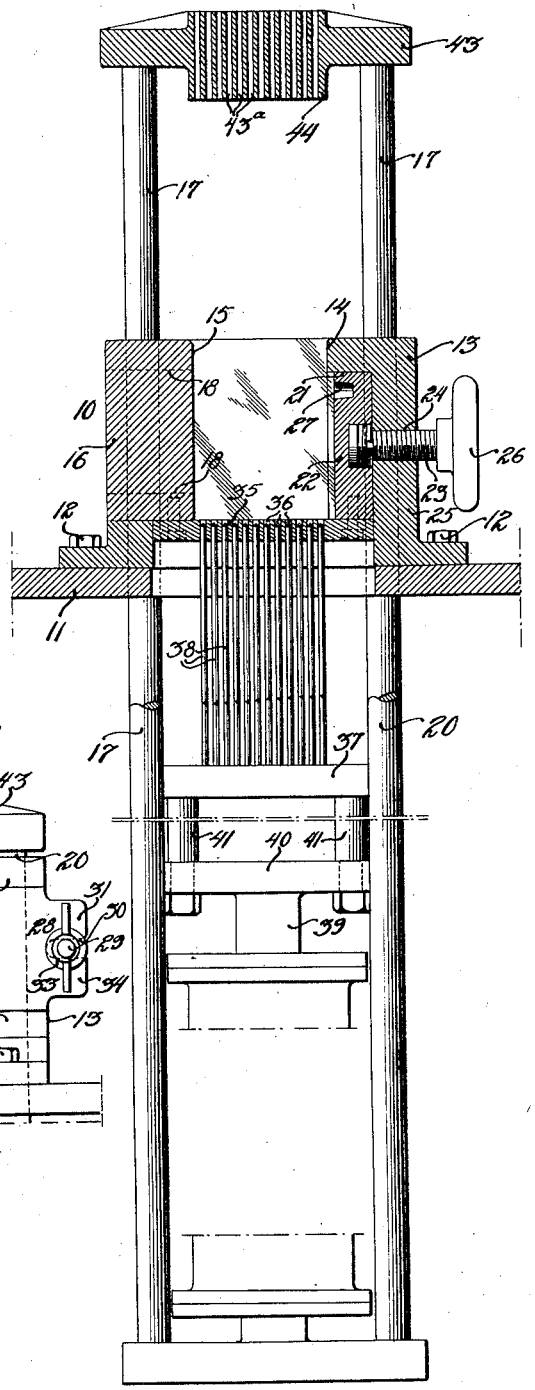

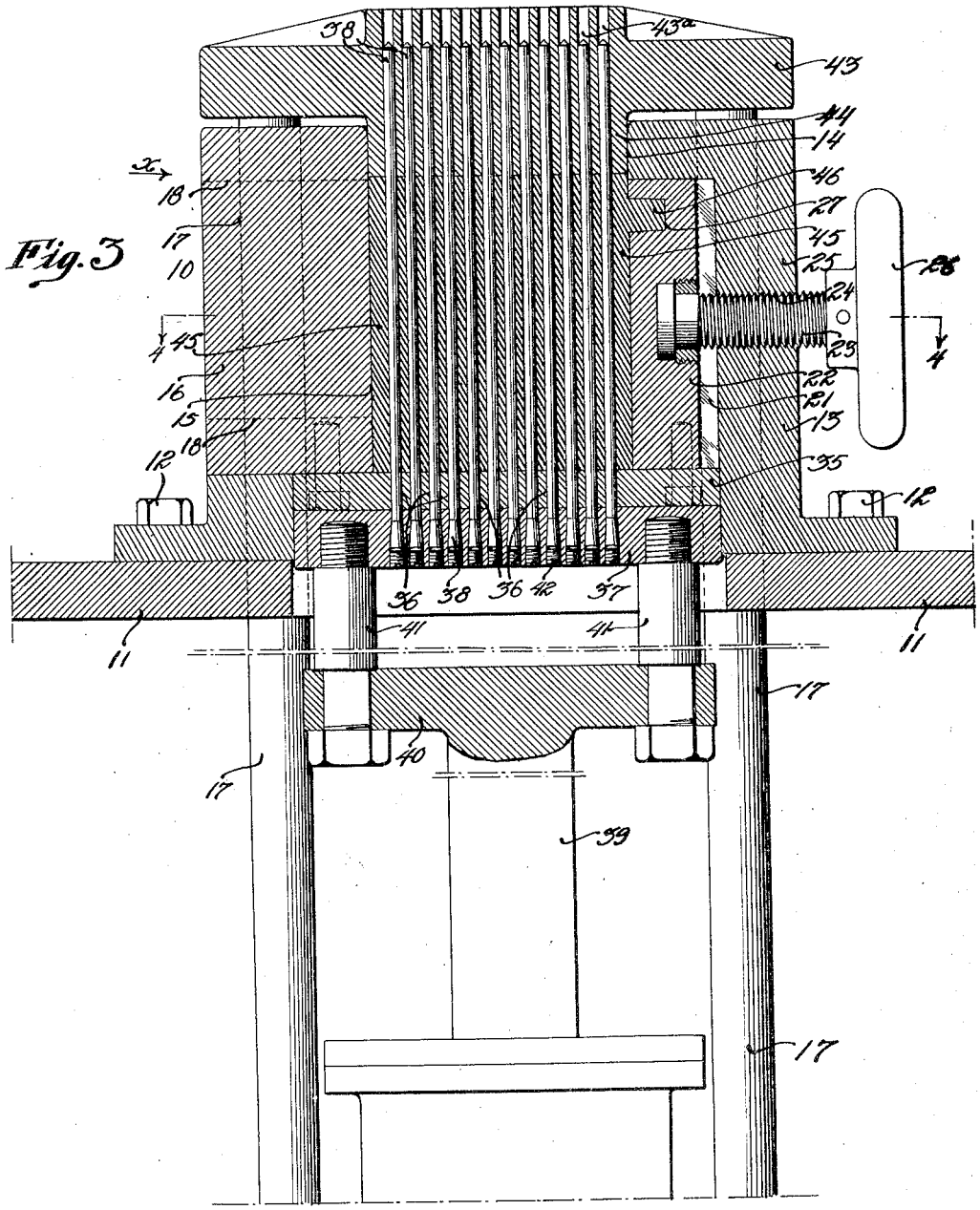

Patented Dec. 11, 1923.

1,476,782

UNITED STATES PATENT OFFICE.

HUGO G. WAGNER, OF POINT PLEASANT BEACH, NEW JERSEY.

APPARATUS FOR MAKING ELECTRIC-BATTERY ELEMENTS.

Application filed February 20, 1922. Serial No. 537,791.

*To all whom it may concern:*

Be it known that I, HUGO G. WAGNER, a citizen of the United States, residing at Point Pleasant Beach, in the county of Ocean and State of New Jersey, have invented certain new and useful Improvements in Apparatus for Making Electric-Battery Elements, of which the following is a specification.

One object of my invention is to provide improved apparatus for making electric battery elements and particularly for making perforated positive and negative block elements for electric batteries as covered in my co-pending application for United States patent, Serial No. 537,790, filed February 20, 1922.

Another object is to so make my improved apparatus that it can be readily operated and will be of a strong and durable construction.

These objects, and other advantageous ends which will be described hereinafter, I attain in the following manner, reference being had to the accompanying drawing in which Figure 1 is a top plan view of apparatus embodying my invention, Figure 2 is an elevational view partly in section taken on the line 2—2 of Figure 1 and shown on a somewhat smaller scale, Figure 3 is an enlarged fragmentary section showing certain of the parts in a different position from that shown in Figure 2 and illustrating the same in an active position for producing a perforated block, Figure 4 is a transverse section taken on the line 4—4 of Figure 3 illustrating the parts having been moved into a position to allow the perforated block to be removed from the apparatus, and Figure 5 is a fragmentary side elevation looking in the direction of the arrow *x* in Figure 3.

Referring to the drawings, 10 represents a mold which is mounted on any suitable supporting structure such for example as a bed 11 which may constitute a portion of a supporting frame; said mold being secured to said bed by bolts 12. The mold 10 includes a body portion 13 which provides a central space 14 which leads from top to bottom of the body portion 13; said space opening at the side 15 and this side opening of the space can be closed by a section 16 of the mold which forms a gate pivotally mounted on one of four rods 17; said rod 17 extending through projecting portions 18 of the mold body adjacent the top and bottom thereof, as clearly shown in Figure 5.

The mold section or gate 16 has a cut out portion 19 to allow it to swing into a position closing said side opening of the space 14 so that the adjacent rod 17, specifically referred to by the reference character 20, can occupy a space within the cut-out portion 19 as shown in dotted lines in Figure 1. The body portion 13 has a recess 21 in line with the space 14 and within this recess is slidably fitted a member 22 to which is rotatably attached a screw threaded stem 23 which fits in a screw threaded hole 24 in the side section 25 of the body portion 13. A hand wheel 26 is secured to the stem 23 outside of the mold and by rotating the hand wheel the member 22 can be moved for example from the position shown in Figure 2 to the position shown in Figure 3 and can also be moved from the position shown in Figure 3 to the position shown in Figure 4. The member 22 has a cavity 27 in its surface opposed to the space 14; said cavity serving for a purpose hereinafter described.

A securing device 28 is adapted to secure the mold section or gate 16 in its closed position; said securing device including a movably mounted rod 29 which is movably supported on the body portion 13; said rod being adapted to fit within a groove 30 in an extension 31 of the gate when the latter is closed: the rod 29 being screw threaded at 32 and provided with a clamping nut 33 for engagement with the end 34 of the extension 31 to firmly hold the gate in a position closing said first mentioned side opening of the space 14.

A plate 35 is secured to the body portion 13 of the mold and forms a bottom for the space 14; said plate having a plurality of holes or perforations 36 arranged vertically therethrough. A carrier 37 in the form of a plate supports a plurality of pins 38 which are vertically arranged and which are slidable through the holes 36 in the plate 35. This carrier 37 can be reciprocated upwardly and downwardly by any suitable means and for this purpose I have illustrated a power operated plunger 39 having a head 40 with posts 41 secured to the carrier 37 so that said carrier can be moved upwardly from the position shown in Figure 2 to the position shown in Figure 3 and then downwardly again into the position shown in Figure 2.

I preferably make the pins 38 so that they can be removed from the carrier 37 in case any of the pins should break or become worn or distorted during the operation of the apparatus as will be described hereinafter. For the purpose of rendering said pins 38 removable, I have shown said pins with their lower portions tapering upwardly in holes within the carrier 37 and the lower ends of said pins supported by screws 42 which are screwed into the lower portions of the holes in the carrier; it thus being merely necessary to remove the screws and push the pins downward when it is desired to replace another. A pressure head 43 is movable upwardly and downwardly by the rods 17 and said pressure head has a depending part 44 of such shape as to fit and move downwardly within the upper portion of the space 14, for example in a position from that shown in Figure 2 into a position shown in Figure 3. The pressure head has perforations 43ª which are arranged vertically and said perforations extend through the depending part 44 so that when the pins 38 are moved upwardly, they will pass through the space 14 in the registering perforations 43ª as shown in Figure 3. I preferably so arrange the construction that the movement of the carrier 37 downward will only be to such extent as to allow the upper portions of the pins to remain within the perforations 36 of the plate 35 with the pressure head 43 elevated as shown in Figure 2.

In the use of the apparatus, to form a perforated block such for example as the perforated block specified in my above mentioned co-pending application for patent, I place the material out of which the block is to be formed within the space 14; said material being illustrated at 45. The carrier 37 is then raised and the pressure head 43 is then lowered so that the material 45 will surround the pins 38 and the pressure head 43 is brought downward a sufficient distance to compress said material 45. The member 22 can be moved inward from the position shown in Figure 2 to the position shown in Figure 3 and thereby exert additional pressure on the material 45 and cause a portion 46 of said material to enter the cavity 27.

I can heat the mold in any suitable manner in order to carry out one of the steps of the process set forth in my above mentioned co-pending application for patent, and for this puropse I have illustrated coils 47 of electric resistance material which can be caused to radiate heat due to the passage of electricity therethrough and these coils can be inserted in filling 48 of refractory or electrically non-conducting material as shown in Figure 4 so that the heat will be absorbed by the portions of the mold which are preferably made of metal and conducted to the material 45 which is being compressed and shaped within the mold so as to produce a perforated block in which the portion 46 will form a post. When the block is finished and after the compressing, molding and heating operation is finished, the gate can be swung into its open position, and the hand wheel 26 can be turned to cause the screw threaded stem 23 to push the member 22 so that said block can be moved laterally out of the space 14 and the operation can be repeated. It will be noted that the perforated block 49 thus formed of the material 45 can be employed for further treatment in accordance with my above mentioned process.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. Apparatus of the character described including a mold having a cavity in its inner wall; means for compressing material in the mold, and means for forcing a portion of the material into the cavity, the mold having a gate section movable to allow the molded object to be withdrawn.

2. Apparatus of the character described including a mold having a cavity in the inner wall; means for compressing material in the mold, and means for forcing a portion of the material into the cavity, the mold having a gate section opposite the cavity movable to allow the molded object to be withdrawn.

3. Apparatus of the character described including a mold having a recess and a cavity in its inner wall; a slidable member fitting the recess; means for compressing material in the mold, and means for moving the slidable member to force a portion of the material into the cavity, the mold having a gate section movable to allow the molded object to be removed.

4. Apparatus of the character described including a mold having a recess in its inner wall; a slidable member fitting the recess and having a cavity in its inner wall; means for compressing material in the mold, and means for moving the slidable member to force a portion of the material into the cavity, the mold having a gate section movable to allow the molded object to be removed.

5. Apparatus of the character described including a mold having a gate section, a cavity in its inner wall and a perforated bottom; a carrier; pins detachably secured to the carrier and extending through the perforations in the bottom of the mold; means for reciprocating the carrier; means for compressing material within the mold, and means for forcing a part of the material into the cavity.

In testimony whereof I have signed my name to this specification in the presence of two subscribing witnesses.

HUGO G. WAGNER.

Witnesses:
WILLIAM J. DORNER,
FRANK A. WILLIAMS.